Dec. 7, 1943.  A. L. FREEDLANDER  2,336,149
METHOD OF MAKING BELTS
Original Filed April 29, 1940
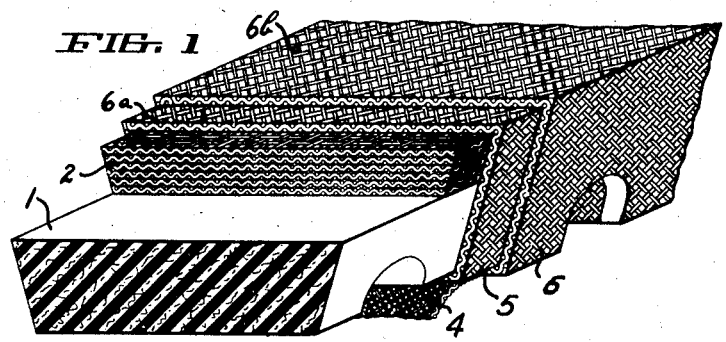
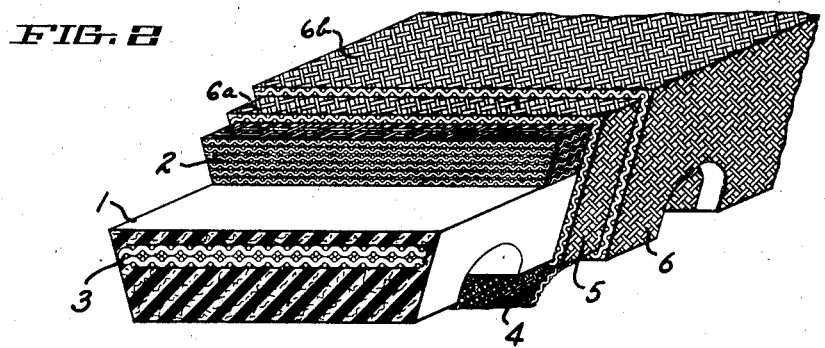
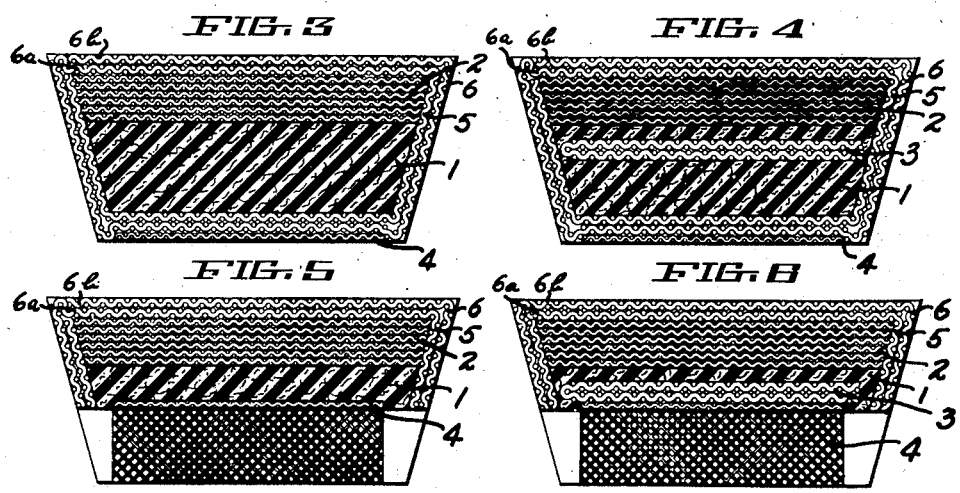
INVENTOR
ABRAHAM L. FREEDLANDER
BY
ATTORNEYS Patented Dec. 7, 1943

2,336,149

UNITED STATES PATENT OFFICE 2,336,149

METHOD OF MAKING BELTS

Abraham L. Freedlander, Dayton, Ohio, assignor to The Dayton Rubber Manufacturing Company, Dayton, Ohio, a corporation of Ohio Original application April 29, 1940, Serial No. 332,225. Divided and this application August 13, 1941, Serial No. 406,638

1 Claim. (Cl. 154—4)

This invention relates to belts and particularly to V-belts, and is a division of my copending application, Serial No. 332,225, filed April 29, 1940.

It is an object of this invention to provide a V-belt which, in operation is strong and relatively inextensible and which is extremely flexible about transverse axes in such manner as to accommodate itself, in operation, to grooved pulleys of various diameters without the production in the belt of harmful internal stresses or destructive strains.

It is a further object of this invention to provide a V-belt of such construction that the neutral axis thereof is disclosed adjacent the outer side thereof, and wherein the compression section comprises fiber reinforced rubber and is provided with teeth formed therein and extending only partially therethrough from the inner or lower side thereof in such manner that the fiber reinforced rubber above the interstices between the teeth provides a resilient connection between the teeth of the compression section.

These and other objects and advantages will appear from the following description taken in connection with the drawing.

In the drawing:

Figure 1 is a perspective cut-away sectional view in perspective of an improved belt made in accordance with this invention;

Figure 2 is a view similar to Figure 1 illustrating a belt of slightly different construction;

Figure 3 is a cross-sectional view taken through a belt constructed as shown in Figure 1;

Figure 4 is a similar cross-sectional view of a belt constructed as illustrated in Figure 2;

Figures 5 and 6 are cross-sectional views of the belt structures illustrated in Figures 2 and 3 respectively taken on a plane extending through a portion cut out to form the teeth.

The body of the belt of the present invention is preferably made by winding a layer of rubber composition reinforced with fine textile fibers which lie parallel to each other around the surface of a mandrel, and laying thereover a plurality of straight-laid square-woven plies of rubberized fabric. This built-up body is then cut to form endless V-shaped belts which are thereafter further processed as hereinafter described.

Referring to the drawing in detail, the belt herein illustrated comprises the compression section 1 formed of rubber reinforced with fine parallel textile fibers disposed transversely therein, upon which is superposed the strength band or strength section 2, which is formed of a plurality of plies of rubberized straight-laid square woven textile fabric secured together in graduated tension. As a modification, the compression section 1 may comprise a section 3 formed of one or more plies of rubberized bias-laid square woven textile fabric as shown in Figure 2.

In order to strengthen the teeth formed in the compression section 1, the lower surfaces thereof are provided with a cover 4 formed of rubberized bias-laid square woven fabric. The tooth covering 4 is preferably secured to the compression section 1 after the teeth are cut therein and, in cutting the teeth, it is preferable that, as shown, the interstices between adjacent teeth terminate at a substantial distance below the upper surface of the compression section 1 in order that a portion of the material of the compression section 1 should extend from tooth to tooth and thus form a reinforcing and cushioning section between the teeth.

Enclosing the sides of the belt is the inner cover member 5 which is also formed of bias-laid square woven rubberized fabric.

Disposed about the inner cover member 5 is the outer cover member 6 which is also formed of bias-laid rubberized square woven textile fabric and the cover layers 5 and 6 are overlapped at the outer or upper side of the belt, as shown at 6a, 6b in order to fully protect the belt and strengthen the cover thereof.

While the tooth covering 4 has been designated as comprising a single ply, it is, of course, to be understood that it may comprise a greater number of plies secured together to provide additional strength to the inner tooth surfaces where such additional strength is necessary or desirable. It is likewise to be understood that the section 3 may comprise either one ply or any number of plies as may be required for the conditions of usage to which the belt is to be subjected.

The material of which the compression section 1 is formed is generally known in the art under the name of "Stiflex." The transverse reinforcements in the material greatly increase the lateral incompressibility thereof while, in no wise, decreasing, and in some instances increasing, the bendability or flexibility of the compression section about transverse axes which are defined by the transversely arranged textile fibers or the rubber disposed therebetween.

The presence of these fibers in the material substantially decreases the impact of the side surfaces of the respective belt teeth upon the driving pulley, because, while the yieldability of the material is not appreciably changed, nevertheless the elasticity or "bounce" of the fiber impregnated rubber is substantially less than that of rubber unprovided with such reinforcement. The reinforcement thus substantially increases the lateral incompressibility of the compression section 1, while also decreasing the bounce or impact of the teeth upon a driving pulley without, in any way, decreasing, but on the contrary, in some instances, increasing the flexibility or bendability of the compression section 1 about transverse axes.

The strength band or strength section 2 is preferably so disposed as to have the neutral axis of the belt disposed therein. The neutral axis of the belt represents the demarcation between parts in tension and parts in compression. In forming the section 2, the plies of straight laid square woven rubberized fabric are preferably wound upon one another at graduated tension, i. e., the lower or inner plies will have greater tension than the outer plies and the tension of the respective plies decreases progressively from the inner or lower ply to the outer or upper ply.

Due to this graduated tension of the plies of the strength section 2, this section normally tends to draw the belt into circular form, and, as the strength band or section 2 is, in effect, the backbone of the belt and adapted to supply the greater portion of the tensile strength thereof, this graduated tension in the strength section 2 materially aids the belt in conforming to acutely arcuate surfaces of grooved driving pulleys of small diameter.

The term "straight-laid" indicates that the threads of the square woven fabric of the section 2, which extend in one direction are disposed substantially parallel to the longitudinal axis of the belt, while the other threads which are substantially perpendicular thereto are disposed transversely of the belt.

The transversely disposed threads serve to aid the bending of the strength section 2, in operation of the belt, while the longitudinally disposed threads impart substantial tensile strength to the strength band or section 2. The tooth covering 4 and the section 3 are formed, as above described, of bias-laid square woven rubberized textile fabric and the term "bias-laid" indicates that the threads, as illustrated, are all disposed diagonally with respect both to the longitudinal and transverse axes of the material and the belt.

The provision of two-ply covering of the side or driving surfaces of the belt by the inner cover member 5 and outer cover member 6 maintains the noise of the belt in operation at a minimum value.

The full overlapping of the outer cover member 6 also provides a flat, continuous outer surface for the belt. As is seen particularly in Figures 1 and 2, the termination of the interstices between the teeth at a substantial distance below the upper surface of the compression section 1 provides a substantial resilient connecting body between adjacent teeth.

The teeth are cut after the sections of the belt body, including the inner and outer cover members of the wrapper, have been assembled and before the built-up structure is placed in the mould for vulcanization. In this case, after the teeth have been cut out of the compression section 1, and through the inner and outer cover members of the belt wrapper, the teeth covering layer 4 is applied over and in between the teeth as shown in Figures 1 and 2. Thereafter, the assembled structure is placed in a mould and subjected to heat and pressure to vulcanize all the belt sections into one complete integral unit or body.

In the belt construction illustrated in Figure 2, the "Stiflex" is provided with a fabric section 3 to increase the tensile strength of the compression section.

It will be understood that the above described structure is merely illustrative of the manner in which the principles of my invention may be utilized and that I desire to comprehend within my invention such modifications as come within the scope of the claim and the invention.

Having thus fully described my invention, what I claim as new and desire to secure by Letters Patent is:

An improved method of making V-belts comprising the steps of introducing a rubberized fabric layer into a composition of rubber reinforced with fine textile fibers to form a strip, winding said strip around a mandrel, laying thereover a plurality of straight-laid square woven plies of rubberized fabric, cutting the built-up belt body so as to form a V-shaped endless belt body, thereafter enclosing the cut belt body with an inner and an outer cover member consisting of biased-laid square woven rubberized fabric, cutting teeth along the inner side surface of the belt, laying a covering member of rubberized fabric over and in between the teeth, said teeth covering member extending as a continuous web longitudinally of the inner surface, and vulcanizing the thus formed belt to unite the laminated layers into an integral unitary belt.

ABRAHAM L. FREEDLANDER.